S. C. LAWLOR.
IMPLEMENT HOLDER.
APPLICATION FILED NOV. 30, 1908.
1,015,625.
Patented Jan. 23, 1912.
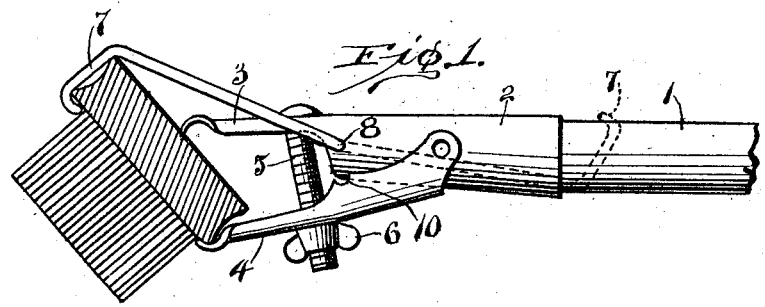
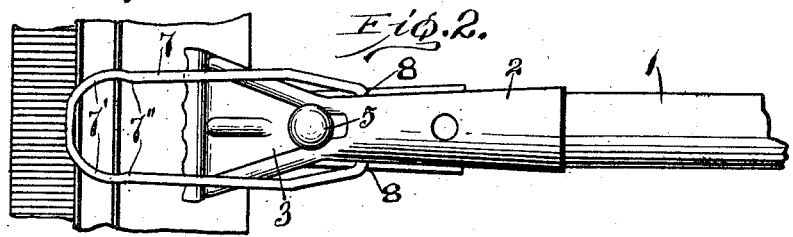
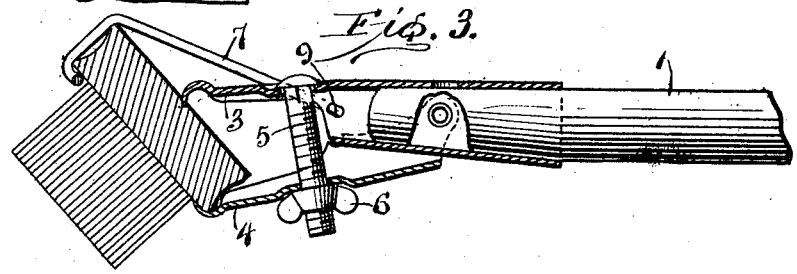
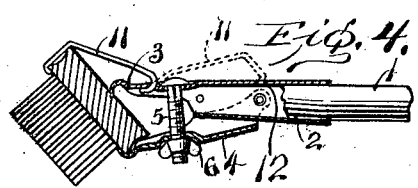
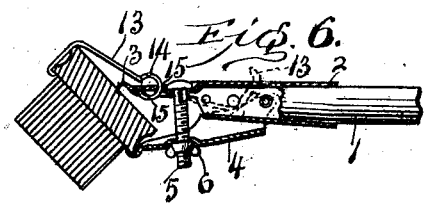
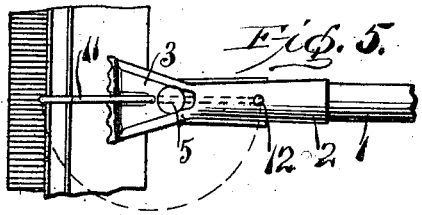
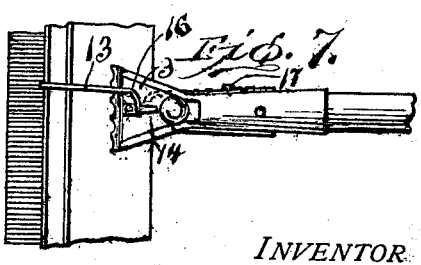
WITNESSES:
O. F. Kitchin
M. M. Kitchin
INVENTOR.
Simson C. Lawlor
BY Edgar M. Kitchin
his Attorney.

UNITED STATES PATENT OFFICE.

SIMEON C. LAWLOR, OF CHICAGO, ILLINOIS.

IMPLEMENT-HOLDER.

1,015,625.

Specification of Letters Patent.  Patented Jan. 23, 1912.

Application filed November 30, 1908. Serial No. 465,337.

*To all whom it may concern:*

Be it known that I, SIMEON C. LAWLOR, a citizen of the United States, residing at Chicago, in the county of Cook and State of Illinois, have invented certain new and useful Improvements in Implement-Holders; and I do hereby declare the following to be a full, clear, and exact description of the invention, such as will enable others skilled in the art to which it appertains to make and use the same.

This invention relates to implement holders of the class adapted for application readily to various implements.

The principal object in view is the firm retention of an implement by a pair of gripping jaws, even though the implement is too large to be squarely inserted between the jaws.

With this and further objects in view as will in part become obvious and in part be stated hereinafter, the invention comprises certain novel constructions, combinations and arrangements of parts, as will be hereinafter specified and claimed.

In the accompanying drawing:—Figure 1 is an edge view of a holder embodying the features of the present invention, a brush being shown in section and grasped by the holder. Fig. 2 is a top plan view thereof. Fig. 3 is a longitudinal, vertical, central section therethrough. Fig. 4 is a view similar to Fig. 3 illustrating a modified form of retaining hook. Fig. 5 is a plan view thereof. Fig. 6 is a view similar to Fig. 4 showing a further modification of the hook. Fig. 7 is a plan view thereof.

Referring to the drawing by numerals, 1 indicates a suitable handle carrying a socket 2, terminating in a jaw 3 and carrying a pivotally connected jaw 4, the jaws 3 and 4 being connected by a clamping bolt 5, provided with the usual nut 6. These clamping jaws, as far as the present invention is concerned, may assume any preferred form.

Pivotally connected to the clamp formed of the jaws 3 and 4 and connections, is a retaining hook 7, which in the disclosure seen in Figs. 1, 2 and 3, assumes the form of a pair of arms formed integral at their outer end and there terminating in a hook form, and at their inner ends bent abruptly, substantially at right angles to the main body of the respective arm, as at 8, forming a pivot, the pivot portion 8 entering an aperture in the rear end of jaw 3 or the forward end of socket 2. The inner end of each pivot portion 8 may be bent, or swaged or otherwise formed with any suitable head, as at 9, for preventing the hook 7 from becoming disengaged from the clamp. The outer ends of the arms forming hook 7 are preferably bent laterally, as best seen in Fig. 2, forming curved portions 7′ and shouldered portions 7″, the curved portions 7′ being adapted, when the hook is swung backward, to the out-of-the-way position indicated in dotted lines in Fig. 1, to snugly fit about the socket 2 and handle 1, the shouldered portions 7″ being sprung past the sides of the socket and thus insuring retention of the hook against accidental forward movement. Thus, when the hook is not needed, it is not in the way, and the clamp may be used in the usual manner, but when the clamp is to be applied to an implement too large to be firmly grasped by the clamp, the hook is swung forward, and the implement is engaged after the manner indicated in the drawing. Nut 6 will of course be loosened for allowing the ready application of the hook to the implement, and will afterward be tightened. It is to be observed that tightening of the nut 6 for producing a clamping action of jaws 3 and 4 also produces a clamping action of hook 7, drawing the jaw 4 toward said hook. Jaw 4 is formed with a recess 10 at each side for accommodating pivot portions 8, and allowing the jaws to come together when the hook is in its out-of-the-way position.

In Figs. 4 and 5, I have illustrated a modified form of hook, the clamp being the same, and the same reference numerals being applied thereto. In this embodiment, the hook 11 has but a single arm, and that is pivoted to the horizontal portion of jaw 3, so as to swing horizontally, as indicated by the dotted semi-circle in Fig. 5. Socket 2 is formed with an aperture 12, into which the free end of the hook is sprung when the hook is swung to its out-of-the-way position, as indicated in dotted lines. The hook is thus adapted to be retained against accidental displacement from its out-of-the-way position.

In Figs. 6 and 7, I have shown a further embodiment, in which the same form of clamp is employed, and to which the same reference numerals have been applied. The hook 13, there shown, is similar to hook 7, in that it is constructed to swing vertically, but it is also similar to hook 11, in that it is formed of a single arm. The outer end of said arm forms the hook proper, and the inner end terminates in an eye 14, which is adapted to revolve vertically through a pair of apertures 15, 15, in the horizontal portion of jaw 3. Intermediate the length of said arm, the same is formed with an offset portion 16, adapting the hook to be swung backward, to the position indicated in dotted lines, and sprung beneath a laterally extending, detent lug 17, carried by the side of socket 2.

Obviously the hook may be connected in many other ways to the clamp within the spirit and scope of this invention.

For the purpose of interpretation of the appended claims, it is obvious that the socket 2 is a handle and may be considered a portion of handle 1.

What I claim is:—

1. The combination of a clamp comprising a pair of pivotally connected jaws and a bolt engaging and to actuate said jaws, of a hook movably engaging and carried by one of said jaws and independent of the other jaw.

2. In a device of the class described, the combination of jaws pivotally connected together, a bolt connecting said jaws for actuating the same, and a hook pivotally carried by one of the jaws and free to move relative to the jaw carrying the same and relative to the other jaw, said hook being adapted to be operatively manipulated by actuation of the clamping jaws under the action of the bolt connecting the jaws.

3. In a device of the class described, the combination with a handle, and a clamp carried thereby, said clamp comprising pivotally connected clamping jaws, of a clamping hook pivotally connected to the clamp, and formed with means coöperating with the handle for temporarily retaining the hook in an out-of-the-way position.

4. In a device of the class described, the combination with a clamp comprising pivotally connected clamping jaws, of a pair of arms pivotally engaging opposite sides of the clamp and extending outwardly therefrom and terminating in a hook.

5. In a device of the class described, the combination with a clamp, and a handle therefor, of a clamping hook pivotally connected to the clamp, said hook being constructed and adapted to be sprung past a portion of the handle for being temporarily retained in an out-of-the-way position.

In testimony whereof I affix my signature in presence of two witnesses.

SIMEON C. LAWLOR.

Witnesses:
GEORGE E. WISSLER,
CHARLES C. SPENCER.